(12) United States Patent
Gingerich

(10) Patent No.: US 6,960,556 B2
(45) Date of Patent: Nov. 1, 2005

(54) SPHERICAL TUNGSTEN DISULFIDE POWDER

(75) Inventor: Richard G. W. Gingerich, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/639,542

(22) Filed: Aug. 12, 2003

(65) Prior Publication Data

US 2004/0038832 A1 Feb. 26, 2004

Related U.S. Application Data

(60) Provisional application No. 60/319,603, filed on Oct. 10, 2002, and provisional application No. 60/319,486, filed on Aug. 23, 2002.

(51) Int. Cl.$^7$ .................. C10M 125/22; C01G 23/00
(52) U.S. Cl. ........................ 508/167; 423/561.1
(58) Field of Search ................ 508/167; 423/561.1

(56) References Cited

U.S. PATENT DOCUMENTS

| | | | |
|---|---|---|---|
| 4,075,111 A | 2/1978 | Bilow et al. ................ 252/12 |
| 4,715,972 A | 12/1987 | Pacholke ..................... 252/28 |
| 5,013,466 A | 5/1991 | Obara et al. ............... 252/42.7 |
| 6,217,843 B1 * | 4/2001 | Homyonfer et al. ...... 423/593.1 |
| 2004/0067385 A1 * | 4/2004 | LeClaire ..................... 428/612 |

FOREIGN PATENT DOCUMENTS

WO    WO 01/66462    9/2001    ........... C01B/31/00

* cited by examiner

Primary Examiner—Jerry D. Johnson
(74) Attorney, Agent, or Firm—Robert F. Clark

(57) ABSTRACT

A tungsten disulfide powder comprised of macro-spherical particles of tungsten disulfide having an average particle diameter of from about 5 to about 50 micrometers is prepared by successively treating spray-dried powders of ammonium metatungstate with heat in air and sulfidizing the resultant tungsten trioxide in a carbon disulfide-containing atmosphere at about 750° C. The tungsten disulfide powder may also be formed to have a bimodal particle size distribution of the macro-spherical particles and smaller, dispersed micro- to submicron-sized fine particles.

9 Claims, 6 Drawing Sheets

SPHERICAL TUNGSTEN DISULFIDE POWDER

CROSS REFERENCES TO RELATED APPLICATIONS

This application claims the benefit of U.S. Provisional Application No. 60/319,603, filed Oct. 10, 2002, and U.S. Provisional Application No. 60/319,486, filed Aug. 23, 2002.

TECHNICAL FIELD

This invention is related to transition metal chalcongenide lubricants. More particularly, this invention is related to tungsten disulfide powders.

BACKGROUND ART

Tungsten disulfide is a solid inorganic lubricate typically applied as a dry film to provide lubrication under conditions that are generally unsuitable for most organic-based lubricants, e.g. high loads, high temperatures (to 500° C. in air) and vacuum environments. Tungsten disulfide powders may be used as an lubrication-enhancing additive in various greases, oils, or self-lubricating polymers. Examples of these applications are described in U.S. Pat. Nos. 4,075,111, 4,715,972, and 5,013,466.

Commercially available tungsten disulfide powders are composed generally of irregularly shaped flat platelets as shown in FIG. 1. It has been postulated that these irregular platelets have chemically reactive edges which cause them to stick to machinery parts and undergo undesirable chemical reactions. Spherical fullerene-like tungsten disulfide nanoparticles have been shown to improve the tribological properties of tungsten disulfide. Such particles are described in International Application No. WO 01/66462 A2. The fullerene-like nanoparticles were made by sulfidizing $WO_3$ in a solid-gas reaction with $H_2S$. The temperature in the reaction path ranged from 750° C. to 850° C. The size and geometry of the $WS_2$ particles was found to be determined by the size and geometry of the $WO_3$ particles being reduced. Larger oxide precursor particles (about 0.5 µm) were slower to convert necessitating the addition of an extra annealing step at 950° C. to complete the conversion. Although larger particles were thought to be a better lubricant in cases where the mating surfaces had higher surface roughness, the process described therein was limited to producing spherical particles up to 0.5 µm.

SUMMARY OF THE INVENTION

It has been discovered that macro-spherical tungsten disulfide particles may be produced in a two-step process. The substantially spherical particles have an average particle diameter of from about 5 to about 50 micrometers, and more preferably from about 10 to about 25 micrometers. The particles tend to be hollow and possess an onion-like structure whereby the outer layers can be peeled away. Because of this, a fraction of the powdered material is comprised of pieces of the macro-spherical particles which appear much like broken egg shells.

In a first step, the macro-spherical particles of tungsten oxide are produced by heating a spray-dried ammonium metatungstate (AMT) powder in air at about 500° C. As shown in FIG. 2, the spray-dried AMT particles have a spherical morphology with a number of the particles appearing to comprise hollow spheres.

In a second step, the tungsten oxide particles are converted to tungsten disulfide by heating in a carbon disulfide-containing atmosphere at about 750° C.

In another embodiment, a bimodal distribution of macro-spherical and smaller, dispersed micron- to submicron-sized fine particles of tungsten disulfide are prepared by heating spray-dried powders of ammonium metatungstate in air, mixing the resultant tungsten trioxide with a tungsten metal powder, and sulfidizing the mixture in carbon disulfide at about 750° C. The resultant tungsten disulfide powder contains a bimodal distribution of the macro-spherical tungsten disulfide particles and fine tungsten disulfide particles having an average particle diameter of from about 0.5 to about 5 micrometers. Preferably, the fine particles have an average particle diameter of from about 1 to about 3 micrometers.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

The following non-limiting examples are presented.

EXAMPLE 1

Figure 1:
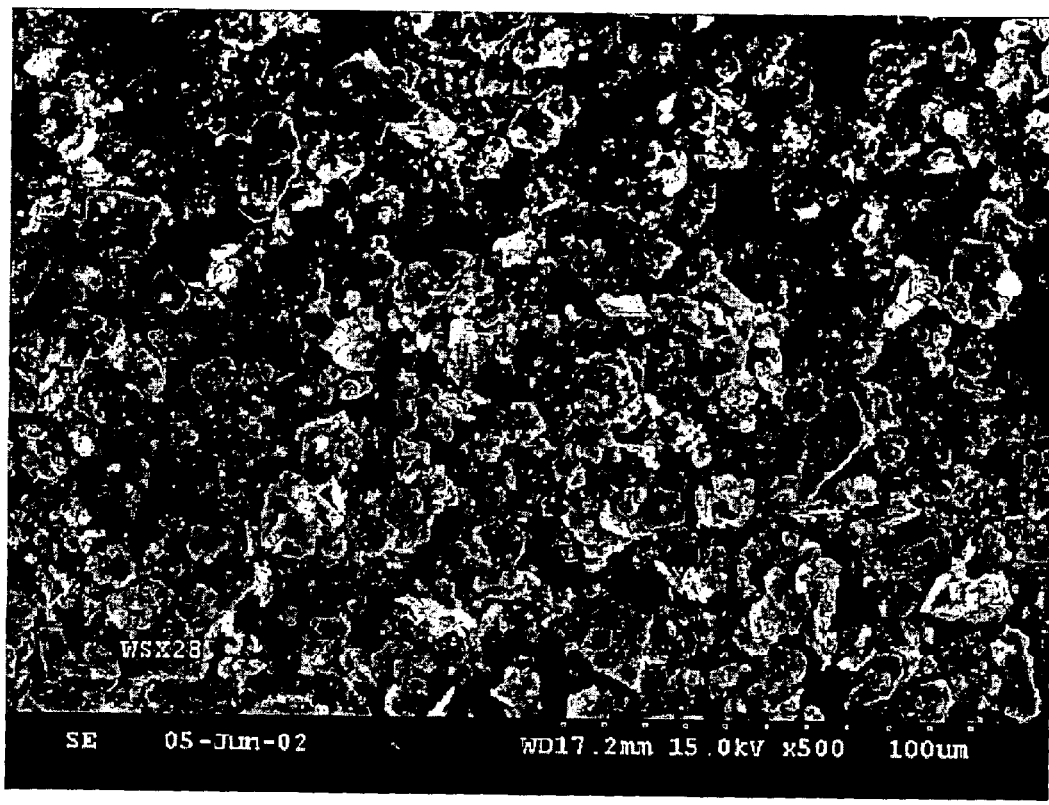
FIG. 1 is an SEM photomicrograph of a prior art tungsten disulfide powder.
Figure 2:
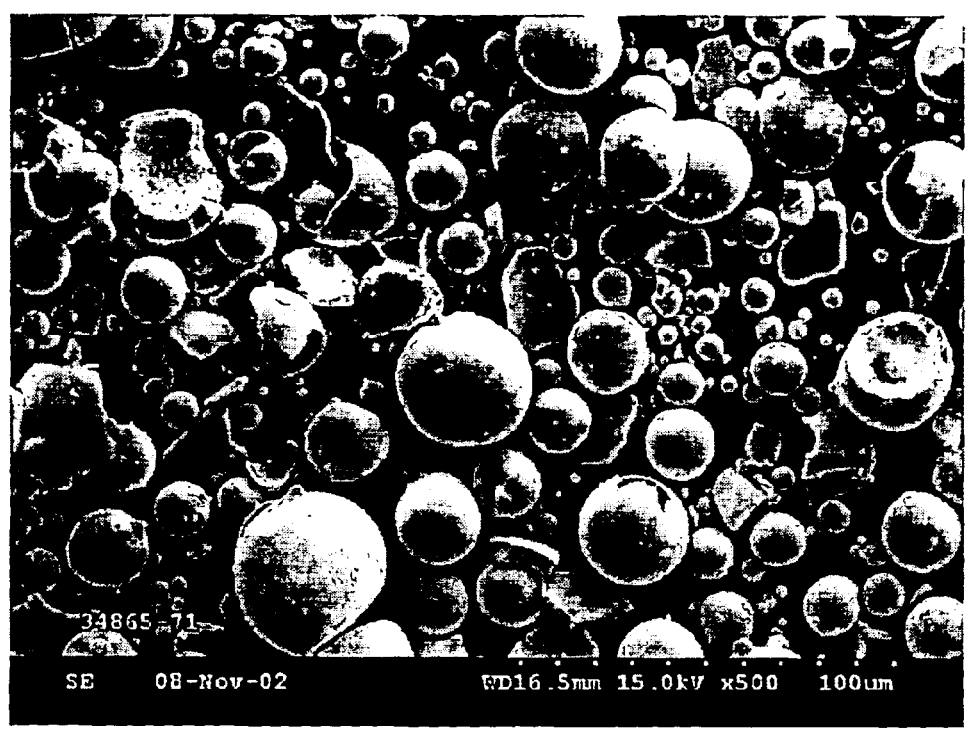
FIG. 2 is an SEM photomicrograph of a spray-dried AMT powder.
Figure 3:
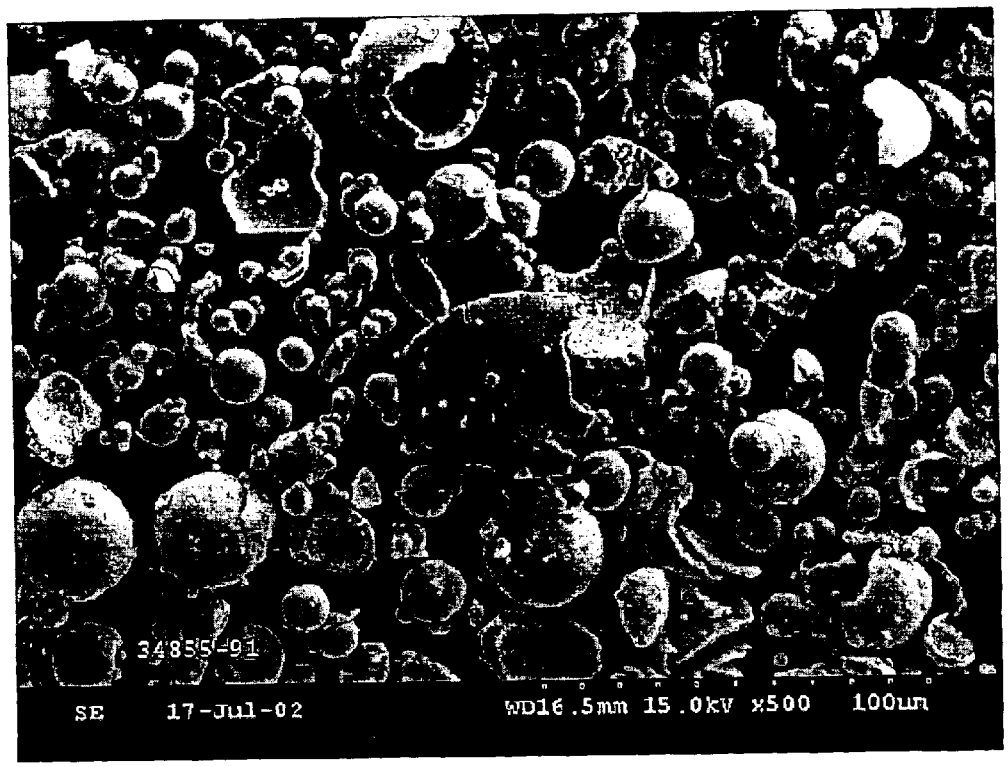
FIG. 3 is an SEM photomicrograph of a intermediate tungsten trioxide powder made by the method of this invention.
Figure 4:
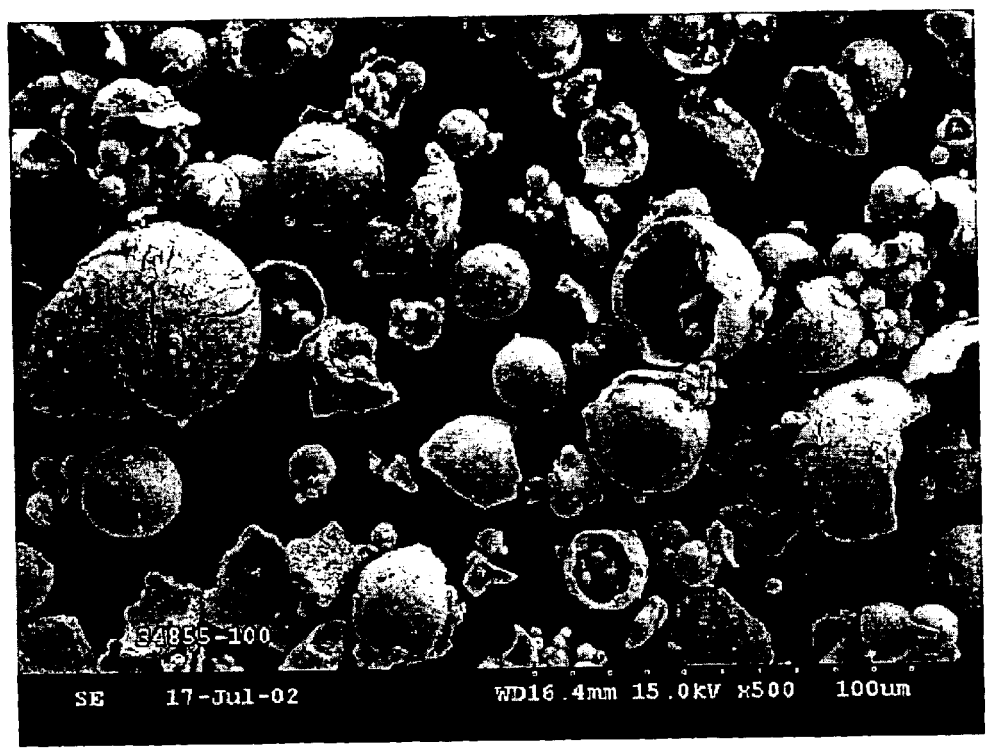
FIG. 4 is an SEM photomicrograph of the macro-spherical tungsten disulfide powder of this invention

A 75.00-g amount of a spray-dried ammonium metatungstate having a BET surface area of 0.63 $m^2/g$ was added to a silica tray (4"×7"×1") which was then heated in a Thermolyne 6000 furnace at 500° C. in air for 2 hours. The resultant yellow solids of tungsten oxide had a weight of 68.81 g. As shown in FIG. 3, the oxide particles were substantially spherical. Next, a 12.61-g amount of the yellow oxide was added to a silica boat (4"×2"×1") which was then placed in a 60 mm diameter quartz tube housed in a Lindberg clam-shell type furnace. Nitrogen gas was bubbled through a bath of carbon disulfide at room temperature at a rate of one cubic foot per hour; the resultant gas mixture was passed through the quartz tube for 1 hour at room temperature. The furnace was then heated to about 750° C. in about 8 minutes and maintained at about 750° C. for about 2 hours. The resultant gray solids of tungsten disulfide had a weight of 13.37 g. Like the yellow tungsten oxide particles, the resultant tungsten disulfide particles also had a substantially spherical shape as shown in FIG. 4. Additional measurements determined that the tungsten disulfide powder had a BET surface area of 7.18 $m^2/g$ and an average particle diameter of 30.5 µm (D50%, Malvern Mastersizer).

EXAMPLE 2

Figure 5:
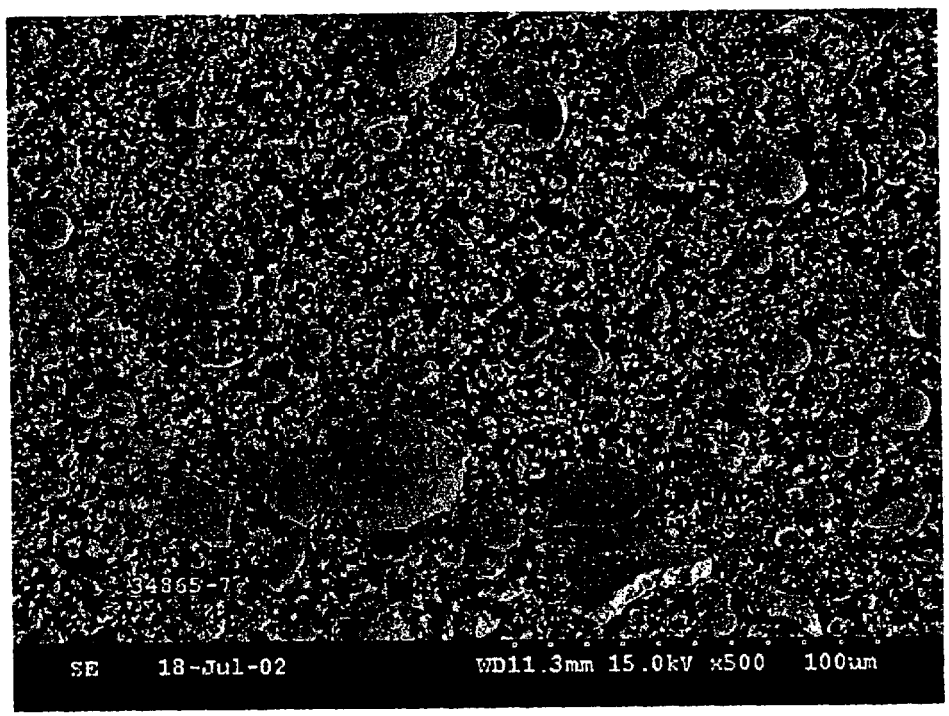
FIG. 5 is an SEM photomicrograph of the bimodal tungsten disulfide powder of this invention.
Figure 6:
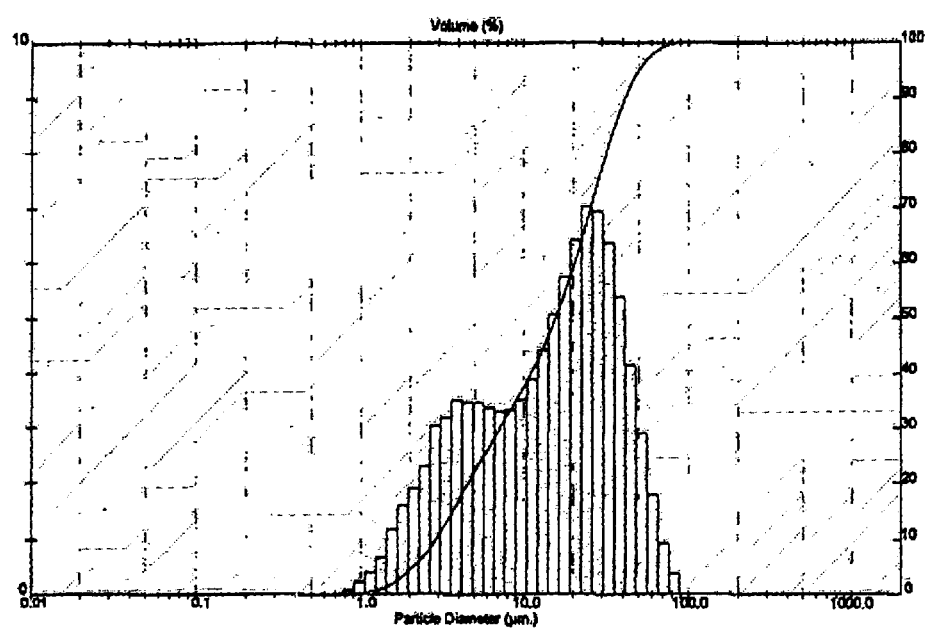
FIG. 6 is a graphical illustration of the particle size distribution of the bimodal tungsten disulfide powder.

A 8.421-g amount of yellow tungsten oxide made from a spray-dried ammonium metatungstate powder was combined with 3.340 g of tungsten powder (OSRAM SYLVANIA Type 10) having an average particle size of about 0.75 microns as measured by Fisher Sub-Sieve Sizer (FSSS) and blended in a 1-oz. flint glass jar on a paint shaker for 20 minutes. The mixed powders were then added to a silica boat and heated in a carbon disulfide-containing atmosphere as described in Example 1. The resultant gray solids of tungsten disulfide had a weight of 13.43 g and were shown to comprise a mixture of macro-spherical and smaller, dispersed micro- to submicron-sized particles (FIG. 5). The particle size distribution of the bimodal tungsten disulfide powder was analyzed in a Malvern Mastersizer and the size distribution is shown in FIG. 6.

While there has been shown and described what are at the present considered the preferred embodiments of the invention, it will be obvious to those skilled in the art that various changes and modifications may be made therein without departing from the scope of the invention as defined by the appended claims.

I claim:

1. A tungsten disulfide powder comprising substantially spherical particles of tungsten disulfide having an average particle diameter of from about 5 to about 50 micrometers.

2. The tungsten disulfide powder of claim 1 where the average particle diameter is from about 10 to about 25 micrometers.

3. A tungsten disulfide powder comprising substantially spherical particles of tungsten disulfide having an average particle diameter of from about 5 to about 50 micrometers and fine particles of tungsten disulfide having an average particle diameter of from about 0.5 to about 5 micrometers.

4. The tungsten disulfide powder of claim 3 wherein the substantially spherical particles have an average particle diameter of from about 10 to about 25 micrometers.

5. The tungsten disulfide powder of claim 3 wherein the fine particles have an average particle diameter of from about 1 to about 3 micrometers.

6. A tungsten disulfide powder comprising substantially spherical particles of tungsten disulfide having an average particle diameter of from about 5 to about 50 micrometers and wherein at least a portion of the tungsten disulfide particles are hollow.

7. The tungsten disulfide powder of claim 6 wherein the hollow particles have an onion-like structure.

8. The tungsten disulfide powder of claim 6 where the average particle diameter is from about 10 to about 25 micrometers.

9. The tungsten disulfide powder of claim 7 where the average particle diameter is from about 10 to about 25 micrometers.

* * * * *